Figure 1:
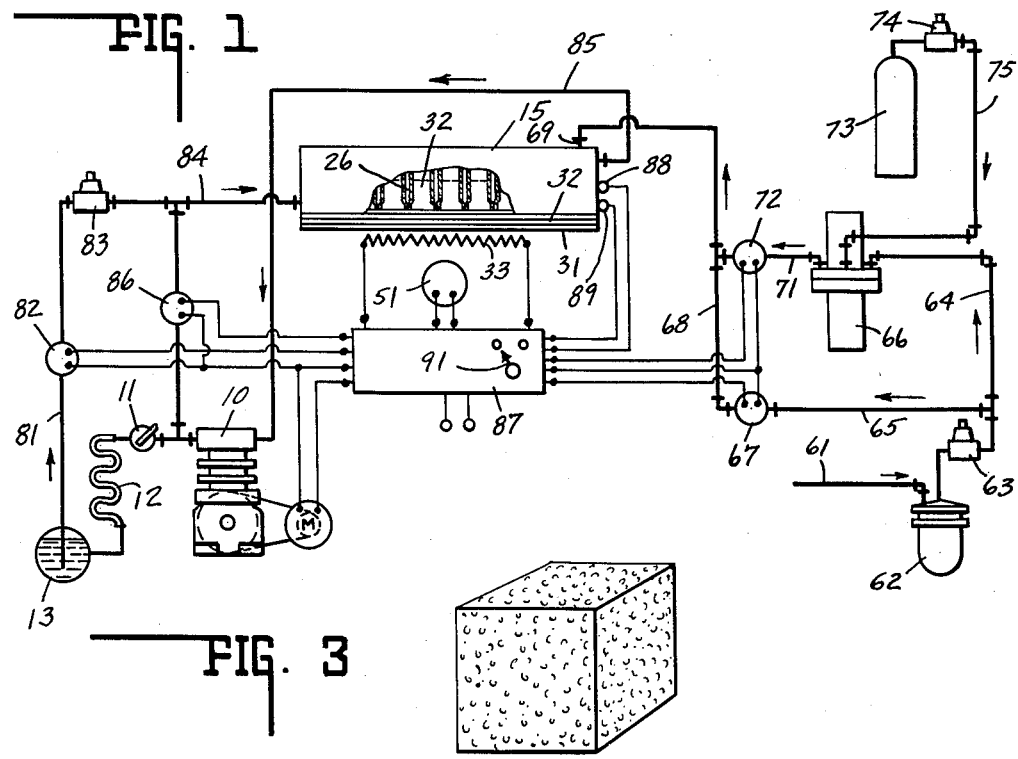

Nov. 20, 1951   J. R. BAYSTON   2,575,509
ICE PRODUCT AND METHOD OF MANUFACTURING
Filed Feb. 18, 1948

INVENTOR.
JOHN R. BAYSTON.
BY
Lockwood, Goldsmith & Galt,
ATTORNEYS.

Patented Nov. 20, 1951

2,575,509

UNITED STATES PATENT OFFICE 2,575,509

ICE PRODUCT AND METHOD OF MANUFACTURING

John R. Bayston, Chicago, Ill., assignor, by mesne assignments, to Icecrafter Trust, a trust comprising John R. Bayston, Van Nuys, and Bernidine B. Oliver, North Hollywood, Calif., and Ward M. Vanderpool, Rockford, Ill., trustees Application February 18, 1948, Serial No. 9,340

4 Claims. (Cl. 62—172)

1

The present invention relates to a novel ice product and to a method by which the product may be manufactured. In introduction, it may be stated that although not limited to beverage uses, the product is especially useful for cooling carbonated beverages and mixed drinks.

It has always been taken for granted that any carbonated drink would, after being opened, lose most of its carbonation and become quite flat and tasteless if allowed to stand even a relatively short period of time. This is particularly true of a mixed drink such as an ordinary highball, in which the agitation of the carbonated mixer in pouring and stirring the drink reduce its initial carbonation greatly, and the presence of melting ice in the drink further dilutes it. These facts are, of course, well known; but despite the known existence of the condition it has never been successfully dealt with. Instead, it has apparently been assumed that the natural and necessary escape of the charging gas from the carbonated water, particularly when combined with melting of the ice in the drink, must necessarily reduce the degree of carbonation in the beverage and dilute it to such an extent as to soon make it too flat to be pleasing to the taste. Efforts have been made to maintain the degree of carbonation at as high a level as possible by using insoluble cooling agents instead of ice in the glass, so that the drink is not diluted by the melting of the ice, but this expedient merely avoids dilution, and since a considerable amount of the carbonating gas must escape from the liquid to give it the desired effervescence, it has been considered unavoidable that the escaping gas soon results in flatness in the drink even though no dilution takes place.

Thus, although the problem of maintaining the proper degree of carbonation in an open beverage has long been recognized, and efforts at solution of the problem have been made, yet no satisfactory solution has heretofore been forthcoming.

The present invention solves the problem, however, and provides a means for maintaining an open beverage in a highly carbonated and thoroughly cooled condition over a considerable period of time. The invention further permits the accomplishment of this result even though the mixture is stirred or agitated; at which time the rate at which the charging gas escapes from the beverage is increased to a degree considerably above normal. In addition, the invention adds to the flavor and palatability of carbonated beverages, and tends to reduce the unpleasant effects of over-indulgence.

These objects are accomplished in the present invention by the provision of a novel ice product containing a relatively large amount of charging gas frozen in a small amount of water, so that

2 when the ice is submerged in a beverage glass the melting of the ice will progressively release the charging gases into the liquid. This action not only cools the beverage, but constantly replenishes the gas content in the liquid, so that it is possible to maintain, or even increase, the degree of carbonation in the liquid as the ice melts.

The invention further contemplates the provision of an ice product consisting of a relatively small cube of gas charged ice wherein the volumetric concentration of the charging gas in the ice is at a maximum in the center of the cube and somewhat less near its outer surfaces, so that the rate of gas release into the beverage is moderate but acting over a large area on initial submersion, but becomes progressively more and more rapid as the size of the cube is diminished by melting. The increasing activity of the cube thus automatically compensates for its diminishing size, and results in maintaining substantially uniform carbonation until the ice is completely gone.

The invention also discloses a means of incorporating free oxygen into a frozen ice product so that the oxygen will be released and absorbed by the liquid of the beverage, as the melting of the product takes place. This accomplishes a double function, since the presence of the oxygen in the liquid of the beverage has been found to increase the palatability of the beverage and to bring out its natural flavor, and at the same time the absorption of the oxygen into the bloodstream of the individual using the beverage tends to avoid or overcome the after-effects commonly resulting from overindulgence.

The ice product with which this invention is concerned may have as a base either plain water or a dilute syrup mixture such as root beer, ginger ale, or one of the cola drinks, and in any case will be charged with carbon dioxide gas in a volumetric ratio determined by the characteristics desired in the product. The product may also contain a substantial volume of oxygen for the purposes indicated above.

Figure 3:
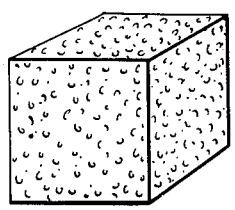
Figure 2:
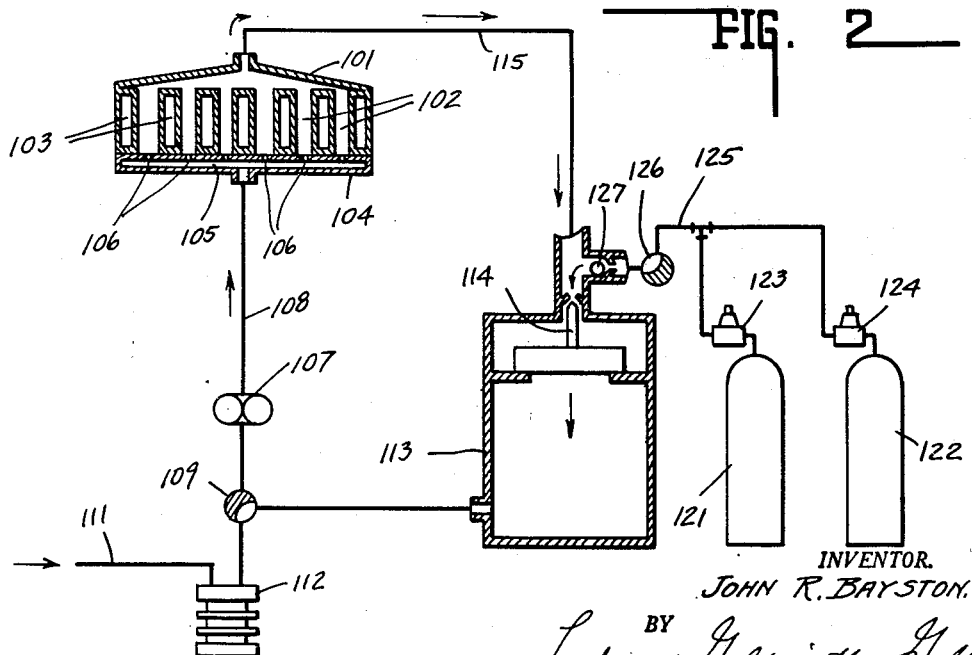

Fig. 1 is a schematic diagram of the refrigerating system and the gas and water supply lines of the machine, together with the electrical control system therefor. Fig. 2 is a schematic diagram illustrative of a modified form of apparatus for practicing the invention. Fig. 3 is illustrative of the ice product produced in accordance with the invention.

In manufacturing the ice product here disclosed, it is preferable to cool and carbonate the liquid before the freezing process is begun. A portion of the liquid is then confined in the presence of the charging gas or gases and is exposed to a freezing temperature and to a pressure substantially above atmospheric pressure. The nature of the ice product, and the apparatus by which the method may be practiced is more particularly disclosed in my co-pending application Serial No. 80,265, filed March 8, 1949, now Patent No. 2,563,093 entitled "Ice Making Machine."

It has been learned that satisfactory results may be obtained by freezing the liquid at a pressure of between 10 and 70 pounds per square inch, gauge pressure, and that when plain water is used, the most satisfactory results are obtained by freezing between gauge pressures of 20 and 70 pounds per square inch. It appears that the minimum pressure of 10 pounds is necessary to achieve a satisfactory degree of carbonation, so that the carbon dioxide gas will be absorbed and frozen into the water in a volumetric ratio of about .66 volumes of free gas to a unit volume of liquid. This is much below the maximum possible concentration, but is effective in a carbonating agent in an open beverage. The pressure of 70 pounds marks the upper limit of satisfactory freezing of plain water, since this gives a volumetric ratio of five volumes of free gas for a given volume of liquid, and ice containing a greater concentration of gas is too readily subject to breaking due to the high internal strain that the gas exerts within the cube. This apparently results from the fact that the film of ice surrounding the gas molecules is not sufficiently strong to hold the cube together, if frozen of plain water at high pressures.

It has also been learned that the strength of the ice film is increased if the ice is formed of a dilute syrup base. With a conventional type of syrup, the product may be satisfactorily manufactured at pressures between the range of 10 and 150 pounds per square inch. The pressure of 150 pounds gives a volumetric ratio of about 10 volumes of gas to 1 of water.

In manufacturing the product, it has also been learned that best results are obtained by freezing the ice in relatively small cakes, such as cubes of two inches or less on a side, so that they are about the size and shape to be conveniently used in beverage glasses. This of course provides an ice cube of convenient size, but more important, it makes it possible to accomplish an important advantage in the actual formation of the ice, so that it will have self-compensating properties tending to maintain uniformity of carbonation in the beverage. It is known that the amount of gas which will be absorbed by the ice in freezing increases as the temperature is lowered and the pressure raised. Thus, by freezing a relatively small cube in a confined space the effective pressure may be increased as the freezing progresses, so that the cube will be formed with a moderate gas concentration around its outer surfaces (which freeze first) and with a progressively higher gas concentration from the outer surfaces inwardly to the center of the cube, which is the last to freeze. This makes a particularly acceptable product for beverage use since the moderate concentration of charging gas on the outer surfaces of the cube does not cause overly active release of gas into the beverage during the initial melting of the cubes, yet as the cube is melted the greater concentration of gas from the center portion of the cube maintains a substantially uniform carbonation until the cubes are completely exhausted.

It may also be pointed out that the utilization of a carbonated ice product for beverage purposes not only tends to replenish the gases lost from the beverage, but also reduces the amount of dilution of beverage due to the melting of the ice. This is because the water content of the product is relatively low and because this water, when melted, is highly carbonated. Thus even the release of the water from the ice does not reduce the carbonation of the rest of the beverage. In addition, since it is well known that expanding gases have a capacity for absorbing heat, it will be apparent that the expansion of the charging gas as it leaves the ice and enters the liquid exerts a still further cooling effect.

The invention also provides for the incorporation of varying amounts of oxygen into the ice, so that the palatability of the beverages is increased and the physical reactions to overindulgence are reduced. In this connection, it has been learned that although it is a known fact that plain water will not absorb free oxygen, yet when the water is charged with carbon dioxide, it is capable of also taking on an additional amount of oxygen; and when the liquid is subsequently frozen it contains a substantial amount of oxygen that will be released as the cube melts. The oxygenation of the product is preferably accomplished by freezing the ice in the presence of a mixture of oxygen and carbon dioxide gases, although it has also been learned that, if carbon dioxide is present, the freezing ice will absorb a certain amount of oxygen directly from the air. Thus, it is practical to achieve a limited degree of oxygenation of the cubes by freezing the liquid under high pressure and in the presence of air and carbon dioxide.

The maximum volume of oxygen that can be absorbed is roughly about one-fifteenth of the volume of the carbon dioxide present, but practical volumetric ratios range between .005 and .05 volumes of oxygen per unit volume of water, with best results between 1 per cent and 3 per cent.

For the first time, the present product makes it possible to maintain a carbonated beverage in a palatable state over a substantial period of time. It will thus be apparent that the teachings of this invention introduces a novel and highly desirable product, and offers a satisfactory solution to a problem that has long been recognized, but has nevertheless heretofore defied solution.

As illustrative of the apparatus for practicing the invention there is shown in Fig. 1 a refrigerating system including a somewhat conventional motor driven compressor 10, check valve 11 and condenser coil 12 arranged to compress a gaseous refrigerant and deliver it to the receiver 13. There is also shown a freezing unit 15 having a series of cells of a character to form small cubes of ice, and more particularly illustrative of my copending application Serial No. 80,265, and having a flat closure plate 31 provided with resilient rubber gaskets 32 across its upper surface to seal the bottom of the freezing unit during the freezing cycle, and to be opened for releasing the frozen ice cubes to permit them to drop by gravity from their respective cells in the unit. The closure plate is provided with an electrical heating unit 33 in order to thaw the ice cubes sufficient to free them from their cells in the unit 15.

The freezing unit 15 is supplied with water or material to be frozen from the supply line 61 extending from a filter 62 and pressure regulating valve 63 to the branch supply lines 64 and 65 leading to a carbonator 66 and a solenoid operated valve 67, respectively. When the valve 67 is open filtered water is supplied to the freezing unit 15 through the line 68 leading to the inlet port 69 in the freezing chamber. The line 64 supplies water to the carbonator 66, from which it passes through the line 71 and solenoid valve 72 to the line 68 and thence to the freezing unit. A cylinder 73 of charging gas, such as carbon dioxide or oxygen, is connected through a reducing valve 74 and line 75 to the carbonator 66. Thus, it will be apparent that if the valve 67 is closed and valve 72 opened, carbonated or gas charged water or the like will be supplied through the same line.

The freezing unit is cooled by refrigerant from the liquid receiver 13, which passes through the line 81 and solenoid valve 82 to a conventional expansion valve 83, from which it flows through the inlet line 84 into the freezing unit to circulate through the channels 26 surrounding the cells 32. The refrigerant evaporates in said channels and the spent refrigerant passes out through the line 85 to the suction side of the compressor 10. Thus, during the freezing cycle, the valve 82 is opened, and the path of the refrigerant is then from the compressor 10 through the check valve 11, condenser coil 12, receiver 13, line 81, valve 82, expansion valve 83, through the freezing unit, and back to the compressor. When the freezing cycle is complete, it is contemplated that hot refrigerant from the condenser circuit of the system may be used to free the ice cubes from the freezing cells with a minimum expenditure of power. To this end, the solenoid valve 82 is closed and the valve 86 opened between the compressor and the inlet line 84, so that hot refrigerant from the pressure side of the compressor and condenser coil passes through the valve 86 and directly to the refrigerant channels 26 of the freezing unit, from which it returns to the compressor through the line 85. This circulation of hot refrigerant through the channels will thaw the surfaces of the ice cubes sufficiently so that they will drop from the cells by gravity when the plate 31 is lowered. The cubes are also released from the plate 31 by the electrical heating unit 33 which may be energized prior to lowering.

The sequence of operations of the valves for the water supply and refrigerant and of the switches to energize the heating unit and motors are governed by a timing and cycling unit indicated at 87 actuated by the temperature responsive bulbs 88 and 89 on one of the side walls of the freezing unit, so that the various instrumentalities operate in a predetermined sequence.

In producing carbonated ice cubes, or ice charged with other gases, the switch 91 is positioned to cause the enclosed circuit 87 so that the valve 72 will be opened and the valve 67 closed. (The reverse arrangement may be utilized to produce clear ice cubes.) Thereupon, the charged water is supplied to the freezing unit from the carbonator 66 and charging gas is delivered from the cylinder 73 so that the ice is frozen in the presence of gas under high pressure. In this respect the sequence of operation of the valves is as follows:

The motor 51 is first energized, moving the plate 31 into its closed position for sealing the bottom of the freezing unit. The solenoid valve 67 being closed, water is forced under pressure through the supply line 61, line 64, carbonator 66, line 71, opening valve 72 into the freezing unit at 69 until the pressure of the trapped air in each cell 32 equals the pressure of the incoming water, thereby regulating the water level in the cells. The valve 82 is opened, so that refrigerant from the liquid receiver 13 passes through the expansion valve 83 and the line 84 into the freezing unit. The refrigerant is vaporized in the channels 26, and the spent refrigerant returns through the line 85 to the compressor, and is again compressed and passed through the check valve 11 and condensing coils to the receiver 13.

The evaporation of the refrigerant in the channels freezes the charged water within the cells, and when the freezing is complete the temperature responsive bulb 88 acts through a suitable control circuit diagrammatically indicated at 87 to energize the heating unit 33, close the solenoid valve 82, and open the solenoid valve 86. With the valve 82 closed, no refrigerant will be supplied to the channels 26 from the evaporator circuit of the refrigerating system, but hot refrigerant from the condensing circuit will be passed through the valve 86 and line 84 to flow into said channels to warm the cell walls and free the individual cubes of ice.

In the modified form of the invention illustrated in Fig. 2 the freezing unit 101 includes a multiplicity of freezing cells 102 and refrigerant channels 103, but is provided with a closure plate 104 having an internal passage 105 and a multiplicity of inlet ports 106, with one of the ports located in each of the freezing cells. The passage 105 is connected with a pump 107 through a supply line 108 leading to the two-way valve 109. The valve 109, in starting position, receives water through the supply line 111 and filter 112 and passes it to the reservoir 113 until the rising level of the water lifts the float valve 114 and closes the line 115 to the top of the freezing unit. The valve 109 is then turned to its opposite position so that the pump 107 will move the water from the reservoir 113 to the freezing cells. The size of the reservoir is such that the quality of liquid contained is the proper amount to be received in the freezing cells 102, but even after the reservoir is filled, operation of the pump 107 may be continued so that as the water in the cells is freezing, air is constantly injected into the bottom of each cell, where it will bubble upwardly through the water while freezing takes place. This results in clear, unclouded ice, and also permits the oxygen present in the air to be absorbed sufficiently to increase the palatability of the ice.

A pair of compressed gas cylinders 121 and 122 (which may contain carbon dioxide and oxygen respectively, for example) are connected through reducing valves 123 and 124 to a gas line 125 and shut-off valve 126 to a check valve 127 entering the line 115. To produce charged ice in this form of the invention, the valve 126 is opened and the valves 123 and 124 set to give the desired mixture of charging gases. The mixture passes through the check valve 127 into the line 115 and reservoir 113, so that the operation of the pump 107 recirculates the gas from the reservoir upwardly through the ports 106, through the water in the cells, and back to the reservoir. Since the plate 104 is firmly held against the freezing unit by any suitable means, for example, as shown in my copending application Serial No. 80,265, the entire system is sealed and may operate under any desired pressure, with the result that any desired degree of carbonation of the ice may be obtained.

From the foregoing, it will be apparent that the teachings of this invention provide a method for manufacturing gas charged ice (an ice making machine) that is inherently simple in construction and operating principle, yet is capable of continuously producing large numbers of individual ice cubes suitable for beverage purposes, and is arranged so that the cubes automatically free themselves from the freezing cells and may be discharged thereupon into a convenient receptacle readily accessible for use.

It is to be noted that the design of the machine permits the freezing unit to be completely sealed during freezing for the manufacture of carbonated ice or ice charged with any other gases, and the recirculation of the charging gases through the water as it freezes aids in achieving a high degree of gas concentration in the ice. The invention thus makes a valuable forward step in the art, in the novel method of freezing ice while flowing air or gas continuously through the liquid until the freezing is complete.

The product resulting from the above described method of producing carbonated ice is generally illustrated in Fig. 3, merely comprising the usual ice cube with a gaseous content illustrated in the exaggerated form of bubbles. However, the gas will be so condensed that it will be undiscernible, but will give the ice a somewhat clouded appearance.

Having thus disclosed the product of this invention and described the preferred method by which it is manufactured, I claim:

1. An ice product consisting of a frozen water containing carbon dioxide in a free volume ratio of between 1.33 and 5 volumes of gas to a given volume of water, and at least .005 volume of oxygen.

2. An ice product consisting of frozen syrup solution containing carbon dioxide gas in a free volume ratio of between 1.33 and 10 volumes of free gas to 1 volume of syrup, and at least .01 volume of oxygen.

3. The method of manufacturing a plurality of individual carbonated ice cubes comprising subjecting water to a freezing temperature in the presence of carbon dioxide under a gauge pressure of between 10 and 70 pounds per square inch and increasing the pressure as the freezing progresses.

4. The method of manufacturing a plurality of individual carbonated and oxygenated ice cubes comprising subjecting water to a freezing temperature in the presence of a mixture of carbon dioxide and oxygen under a pressure of between 10 and 70 pounds per square inch and increasing the pressure as the freezing progresses.

JOHN R. BAYSTON.

REFERENCES CITED

The following references are of record in the file of this patent:

UNITED STATES PATENTS

| Number | Name | Date |
|---|---|---|
| 850,607 | Schroder | Apr. 16, 1907 |
| 1,743,375 | Mundorf | Jan. 14, 1930 |
| 2,361,137 | Terry | Oct. 24, 1944 |
| 2,387,921 | MacDonald | Oct. 30, 1945 |
| 2,394,647 | West | Feb. 12, 1946 |

FOREIGN PATENTS

| Number | Country | Date |
|---|---|---|
| 703,569 | Germany | Feb. 6, 1941 |
| 798,523 | France | Feb. 19, 1935 |